(12) United States Patent
Jevsnik (10) Patent No.: US 11,832,563 B2
(45) Date of Patent: Dec. 5, 2023

(54) SUBSTANCE INTRODUCTION METHOD FOR PLANT AND PLANT OBTAINED THEREWITH

(71) Applicant: Hanson Uitgevers B.V., Rotterdam (NL)

(72) Inventor: Tomaz Jevsnik, Dobrovnik (SI)

(73) Assignee: Hanson Uitgevers B.V., Rotterdam (NL)

( * ) Notice: Subject to any disclaimer, the term of this patent is extended or adjusted under 35 U.S.C. 154(b) by 0 days.

(21) Appl. No.: 17/588,976

(22) Filed: Jan. 31, 2022

(65) Prior Publication Data

US 2023/0016166 A1 Jan. 19, 2023

Related U.S. Application Data (63) Continuation of application No. 16/423,275, filed on May 28, 2019, now abandoned, which is a continuation of application No. 15/236,971, filed on Aug. 15, 2016, now abandoned, which is a continuation of application No. 14/448,609, filed on Jul. 31, 2014, now Pat. No. 9,420,749.

(30) Foreign Application Priority Data

Sep. 27, 2013 (NL) ..................................... 1040416

(51) Int. Cl.
*A01G 29/00* (2006.01)
*A01G 7/06* (2006.01)
*A01G 9/02* (2018.01)

(52) U.S. Cl.
CPC .............. *A01G 29/00* (2013.01); *A01G 7/06* (2013.01); *A01G 9/02* (2013.01)

(58) Field of Classification Search
CPC ............. A01G 29/00; A01G 7/06; A01G 9/02
See application file for complete search history.

(56) References Cited

FOREIGN PATENT DOCUMENTS

WO WO-2012141579 A1 * 10/2012 ............... A01G 7/06

OTHER PUBLICATIONS

Orr et al. Field Observations of Tree Injection, Journal of Arboriculture 14(11): 1988, 269-273. (Year: 1988).*

* cited by examiner

*Primary Examiner* — June Hwu
(74) *Attorney, Agent, or Firm* — Schroeder Law PC (57) ABSTRACT

A plant, in particular a *Phalaenopsis* orchid, provided with a hole into its stem, wherein the hole is accessible via an opening in an outer surface of the stem, wherein the hole allows the interior of the stem to be exposed to a substance entering the plant via the opening so that the substance can enter the interior of the stem, wherein the hole has a dimension in a direction parallel to a longitudinal axis of the stem which is larger than a maximum dimension of the opening providing access to the hole in the direction parallel to the longitudinal axis of the stem, and wherein the diameter of the opening is above 2 mm, wherein in the longitudinal direction of the stem of the plant, the hole extends in a direction away from the roots of the plant and also in a direction towards the roots of the plant.

3 Claims, 4 Drawing Sheets

SUBSTANCE INTRODUCTION METHOD FOR PLANT AND PLANT OBTAINED THEREWITH

CROSS-REFERENCE TO RELATED APPLICATIONS

This application is Continuation of U.S. application Ser. No. 15/236,971, filed on Aug. 15, 2016, which is a Continuation of U.S. application Ser. No. 14/448,609, filed on Jul. 31, 2014, now U.S. Pat. No. 9,420,749, which claims priority under 35 U.S.C. § 119(a) to Application No. 1040416, filed in The Netherlands on Sep. 27, 2013, all of which are hereby expressly incorporated by reference into the present application.

BACKGROUND OF THE INVENTION

The invention relates to a substance introduction method for a plant, in particular a pot plant, e.g. an orchid.

Over the years many different substance introduction methods have been developed to introduce all kinds of substances into a plant, mainly by fluid introduction, which substances may comprise pesticides, fungicides, nutrients, water, flavorants, odorants, colorants and suitable solutions thereof.

An example of a prior art substance introduction method can be found in international patent publication WO93/02546 in which hollow spikes, which are in communication with a reservoir, are pressed into the stem of a plant, such that a transverse passageway of the spikes is located within the xylem system of the plant. Any fluid inside the reservoir is then taken up by the plant using the transpiration pull of the xylem system.

A disadvantage of WO93/02546 is that the system required to perform this method is rather complex. Fabricating and subsequent positioning the spikes with the transverse passageways is not easy.

Another example of a prior art substance introduction method can be found in international patent publication WO87/01559 in which an unpressurized reservoir is connected to the plant via a probe that is able to penetrate the epidermis of the stem of the plant.

A disadvantage of WO87/01559 is that the construction with the reservoir and probes is relatively large compared to the size of the stem of the plant, so that additional mounting aids are required. An additional disadvantage of using probes or needles, e.g. hypodermic needles, that remain connected to the stem during the substance introduction is that there is a significant risk to damage the stem of the plant while handling the probe/needle due to the sharp tip of the probe/needle.

Another example of a prior art substance introduction method can be found in international patent publication WO2012/067496 in which the roots of the plant are physically injured and subsequently the injured roots are brought into contact with a fluid.

A disadvantage of WO2012/067496 is that the plant is severely injured with the chance of the plant dying and that the method is laborious, because of the many steps required, as for instance the plant needs to be taken out of the soil to injure the roots.

A further example of a prior art substance introduction method can be found in European patent publication EP2.308.282 in which a hole is made into the stem of the plant to receive the tip of a pipette, which pipette needs to be fixed to the plant until the fluid is absorbed by the plant.

A disadvantage of EP2.308.282 is that it is not easy to fix the pipette to the plant without leakage.

Yet another example of a prior art substance introduction method can be found in French patent publication FR2.879.073 in which the plant is watered with a substance containing fluid, which is then absorbed by the roots in a natural way.

A disadvantage of FR2.879.073 is that in order for the plant to absorb a certain amount of fluid, a multiple of that amount needs to be introduced into the soil around the plant. Hence, the efficiency is very low compared to methods where the substance containing fluid is administered to the plant in a more direct way.

Another example of a prior art substance introduction method can be found in international patent publication WO2010/085082 in which branches are cut and a storage tube is coupled to the cut branch to introduce fluid into the plant.

A disadvantage of WO2010/085082 is that cutting the branches is not possible or desired for all types of plants, that it is not the most efficient method, that it reduces the value of the plant, and that it requires special measures to make a proper seal between the tube and the cut branch in order to prevent fluid from unintentionally leaking away between the tube and the branch.

A further example of a prior art substance introduction method can be found in US patent publication U.S. Pat. No. 6,405,480 in which a reservoir is formed around the cut stem of a Christmas tree, so that fluid can be forced into the stem to prevent the tree from drying and becoming a fire hazard.

U.S. Pat. No. 6,405,480 assumes that the stem is cut, which is usually the case with a Christmas tree, but is most of the time for all other purposes not desired. Further, the disclosure is complex to implement in practice for a pot plant when the intention is to keep the plant alive for more than a couple of weeks.

Substances may be introduced into plants for different reasons. Pesticides, nutrients, etc. are usually introduced to improve the well-being of the plant, while flavorants, colorants, odorants and the like are introduced to improve the esthetic value perceived by customers buying or using the plants. It is known that some of these substances may be harmful to the plant and that depending on, amongst others, the substance introduction method the life of the plants is shortened or some parts of the plant, such as the flowers or buds, die easily and/or quickly.

BRIEF SUMMARY OF THE INVENTION

In view of the above it is an object of the invention to provide an improved method for introducing a substance into a plant, in particular a pot plant.

To achieve this object, there is provided a method for introducing a substance into a plant, in particular a pot plant, wherein said method comprises the following steps:

forming a final hole into a stem of the plant, wherein the final hole is accessible via an opening in an outer surface of the stem, and wherein the final hole has a dimension in a direction parallel to a longitudinal axis of the stem which is larger than a maximum dimension of the opening in said direction parallel to the longitudinal axis of the stem;

subjecting the interior of the final hole to the substance by introducing the substance through the opening.

A main advantage of the invention is that the hole is enlarged in the direction parallel to the longitudinal axis of the stem such that the area of the interior wall is increased compared to prior art methods, resulting in more tissue of the plant being subjected to the substance. The effect is that the substance is easier and more quickly absorbed by the plant.

An example in which the enlarged hole is advantageous is in case an air bubble gets trapped within the final hole. This air bubble may at least partially block the taking up of substance by the plant. By enlarging the hole, the negative effect of a trapped air bubble is diminished.

The fact that the size of the opening providing access to the final hole seen in a direction parallel to the longitudinal axis of the stem of the plant is smaller than a corresponding size of the final hole in said direction also allows to more easily close the opening after substance introduction and/or keeps the introduced weakening of the stem of the plant within limits.

In an embodiment, forming the final hole comprises the steps of forming an initial hole with corresponding opening in the stem of the plant, and subsequently extending the size of the initial hole through the already made opening in the stem of the plant. This provides a two-step process which in general is easier to perform than a one-step process. However, an advantage of the one-step process is that it can be performed faster.

A hole in this specification is broadly defined and includes any cavity, cut or passageway extending from an opening in an outer surface of the stem into the interior of the stem allowing the interior of the stem to be exposed to a substance entering the plant via the opening. As an example, making a longitudinal cut in the stem of the plant falls within this definition when this results in an opening in the outer surface of the stem through which a substance can enter the interior of the stem of the plant. Hence, in case a cut is made with a very thin blade resulting in injuring the stem of the plant, but in which the opposing walls of the cut are sealed together after removal of the very thin blade, so that no substance can enter the interior of the stem of the plant, this is not a hole as defined in this specification.

In an embodiment, forming the final hole comprises one or more of the following operations: drilling, cutting, suction, vaporizing, lasering, chemical etching and piercing. In an embodiment, the initial hole may be formed by drilling, cutting, suction, vaporizing, lasering, chemical etching and/or piercing. Extending the size of the initial hole may also comprise drilling, cutting, suction, vaporizing, lasering, chemical etching and/or piercing, wherein preferably forming the final hole and extending its size may be done using identical operations or using different operations.

In an embodiment, the initial hole is formed by inserting a first tool into the stem in a direction perpendicular to a longitudinal axis of the stem, wherein the size of the initial hole is extended, i.e. increased, by again introducing the first tool or by introducing a second tool through the opening in the stem in a direction making an acute angle with the longitudinal axis of the stem. An advantage of this embodiment is that the initial hole is easily made due to the perpendicular direction, and the more complex extension of the initial hole is done using the opening in the stem as a guidance, thereby making this method step easier to perform.

In an embodiment, the initial hole is formed by drilling into the stem of the plant, wherein if desired a stop may be used during drilling to prevent the drill bit from drilling through the stem of the plant.

In an embodiment, the method according to the invention comprises the steps:

forming an initial hole into the stem of the plant, wherein the initial hole has a substantially constant cross-section corresponding to an opening of the initial hole at an outer surface of the stem of the plant, and wherein the initial hole extends from the opening of the initial hole perpendicular to a longitudinal axis of the stem of the plant;

extending the size of the initial hole in a direction parallel to the longitudinal axis of the stem of the plant via the opening of the initial hole, thereby forming a final hole according to the invention, wherein extending involves removing plant material via the opening of the initial hole.

Removing plant material has the advantage that the volume of the final hole is increased allowing to store more substance into the stem.

In an embodiment, the size of the initial hole is extended at least in a direction away from the roots of the plant, which is the direction in which the introduced substances need to travel in most cases.

In an embodiment, the size of the initial hole is also extended in a direction towards the roots of the plant as this also increases the hole and the area of the interior wall that is subjected to the substance and thus aids in the substance absorption process of the plant.

In an embodiment, forming the initial hole comprises inserting a hypodermic needle with a beveled tip into the stem and subsequently rotating the needle about its longitudinal axis, wherein during these steps the longitudinal axis of the needle is perpendicular to a longitudinal axis of the stem. In this way, the side edges of the beveled tip can cut through the plant tissue when rotating the needle. An advantage of using a hypodermic needle in this way is that a standard tool can be used instead of a custom made tool, and that a hypodermic needle is hollow allowing to receive plant material during the cutting action.

In an embodiment, extending the size of the initial hole and/or removing plant material comprises inserting a hypodermic needle with a beveled tip through the opening of the initial hole into the stem and subsequently rotating the needle about its longitudinal axis, wherein during these steps the longitudinal axis of the needle makes an acute angle with respect to a longitudinal axis of the stem, preferably an angle between 30-60 degrees, more preferably 45 degrees. By rotating the needle, the side edges of the beveled tip can cut through the plant tissue.

In a preferred embodiment, the tip of the hypodermic needle is directed towards a free end of the stem of the plant, i.e. away from the roots, which is most of the times upwards, so that an additional cavity is formed above the opening in the stem of the plant. Additionally or alternatively a cavity may be formed below the opening in the stem of the plant.

In an embodiment, extending the size of the initial hole and/or removing plant material comprises introducing an instrument or tool provided with cutters into the initial hole via the opening, extending said cutters in a direction parallel to the longitudinal direction of the stem of the plant, retracting the cutters, and withdrawing the instrument or tool from the hole. In this way, the instrument and/or tool can be easily introduced into the already formed initial hole and the size can be extended by subsequently operating the cutters.

In an embodiment, forming the final hole comprises removing plant tissue from the stem of the plant, preferably during the formation of an initial hole and additionally or alternatively during extending the size of the initial hole. Removing plant tissue has the advantage that the internal volume of the final hole is increased allowing to receive more substance into the final hole.

In an embodiment, removing plant material comprises suction and/or cutting. In an embodiment, specific organisms, e.g. animals, insects, bacteria, etc., may be used to eat away the plant material in order to form the initial and/or the final hole.

In an embodiment, no plant material is removed while forming the final hole, so that the final hole mainly comprises of cuts in the stem of the plant, which expose the internal tissue of the plant to the substance.

In an embodiment, the size of the opening in the stem of the plant is specifically chosen to set a desired flow rate or flow resistance, wherein the hole inside the stem of the plant is made large enough by applying the invention to ensure that the opening forms the main or dominant flow resistance. Substance introduced via the opening in the stem of the plant may mix with fluids coming from the roots of the plant. By setting the flow rate or flow resistance through the opening in the stem, the mix ratio may be set. The mix ratio may for instance be used to obtain a desired effect, e.g. the mix ratio may determine the appearance of flowers when a colorant is introduced via the opening in the stem of the plant. Further, the mix ratio may also be set to keep the plant healthy in case the introduced substance may negatively affect the health of the plant, especially in case the introduced substance negatively affect the health of the plant only at relatively high doses.

It is explicitly mentioned here that the invention is not limited to final holes with only a single opening allowing access to the interior of the final hole. The invention may also be applied to a final hole comprising multiple openings, as is for instance the case when the initial hole is a through-hole, which through-hole may e.g. be made by drilling through the stem of the plant. However, the feature that the final hole has a dimension in a direction parallel to a longitudinal axis of the stem of the plant larger than the a maximum dimension of the opening in said direction has to be satisfied by all openings providing access to the final hole in order to be in accordance with the invention.

It will be clear to the skilled person that the substances to be introduced into the plant may be introduced in any form including solid substances, e.g. powder, fluidic substances, such as liquids, gasses, solutions, etc. or semi-solid substances such as pastes. In an embodiment it is possible to mix substances inside the final hole. For instance, a colorant may be introduced in the final hole in powder form and subsequently a liquid, e.g. water, may be introduced into the final hole to dissolve the powder into the water to get a solution that can be taken up by the plant.

The substances introduced or to be introduced into the plant may include:
 pesticides;
 fungicides;
 nutrients;
 flavorants;
 colorants;
 odorants;
and any mixtures or suitable solutions thereof.

The substance may alternatively be referred to as matter, component, ingredient, element, constituent, material or essence, and for instance also as compound, mixture, blend or composition when the substance contains multiple ingredients.

The final hole in the stem of the plant may be a through hole, such that two openings are formed in the stem of the plant, but in a preferred embodiment, the final hole is a blind hole, wherein preferably the depth of the final hole is larger than the radius of the stem of the plant.

The diameter of the opening of the final hole is preferably above the 2 mm, more preferably 3 mm. The maximum diameter is determined by the diameter of the stem of the plant.

When the introduction of substance into the plant is or has ended, the final hole may have to be closed in order to prevent the plant from dying. The final hole may be closed after removal of components used to introduce substances into the plant via the final hole, such as pipettes, needles, etc.

The step of closing the final hole may comprise providing the interior wall of the final hole with a layer of material preventing said wall from drying, i.e. applying a layer of material to the interior wall. This layer of material may for instance be sprayed into the final hole or by exposing the interior of the final hole to a solution such that a layer of material is deposited on the interior wall of the final hole.

The final hole in the stem is preferably closed using wax, preferably bee wax, and/or the interior wall is provided with a layer of wax, preferably also bee wax. Providing a layer of material on the interior wall of the final hole and closing the final hole may be done in a single operation by completely filling the final hole with material, e.g. the bee wax.

The invention also relates to a plant, in particular a pot plant, provided with a final hole into its stem, wherein the final hole is accessible via an opening in an outer surface of the stem, and wherein the final hole has a dimension in a direction parallel to a longitudinal axis of the stem which is larger than a maximum dimension of the opening in the direction parallel to the longitudinal axis of the stem In an embodiment, when seen in longitudinal direction of the stem of the plant, the final hole extends at least in a direction away from the roots of the plant.

In an embodiment, the final hole also extends in a direction towards the roots of the plant.

In an embodiment, the interior wall of the final hole is covered with a layer of material preventing the interior wall from drying.

In an embodiment, the final hole is closed off by material preventing the interior of the final hole from drying. This material may be wax, preferably bee wax.

Preferably the plant is not a woody stemmed type plant, but comprises soft stem tissue with hard outer wall (e.g. cuticle) or epidermis (e.g. as in herbaceous plants). The plant is preferably a plant that at least in its youth stage has stems that are not lignified. The plant is preferably a herbaceous plant with soft stem tissue.

Preferably the plant is a vascular plant, more preferably a plant in the orchid family (orchidaceae) and most preferably the plant is a *Phalaenopsis* orchid or a Denbromium orchid.

The hole in the stem preferably has a depth which is larger than a radius of the stem at the location of the hole. The depth of the hole may for instance be between 50% and 90% of the diameter of the stem, preferably between 60% and 90% of the diameter of the stem, and more preferably between 75% and 85% of the diameter of the stem. The diameter of the hole may be in the range of 30% to 70% of the diameter of the stem and is preferably between 40% to 60% of the diameter of the stem. The depth of the final hole is preferably such that the xylem system on both sides of the stem can be used to transport substances introduced into the final hole.

In an embodiment, the final hole is filled with wax to close off the opening in the outer surface of the stem.

BRIEF DESCRIPTION OF THE DRAWINGS

The invention will now be described in a non-limiting way with reference to the accompanying drawings in which like parts are indicated by like reference symbols and in which.

DETAILED DESCRIPTION OF THE INVENTION

Figure 1:
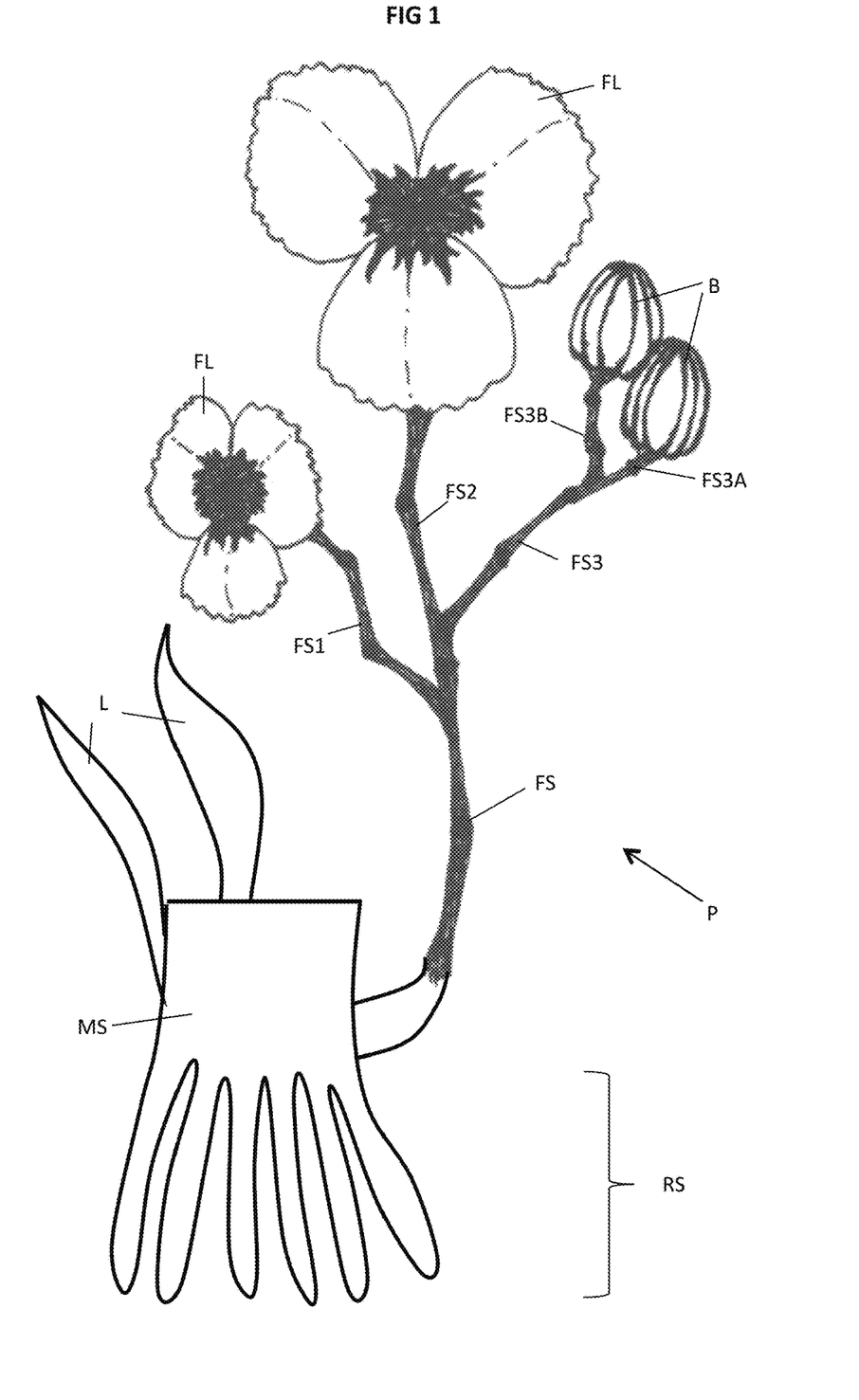
FIG. 1 depicts schematically a plant, in particular a pot plant.

FIG. 1 depicts a schematic drawing of a plant P, in particular a pot plant. FIG. 1 shows schematically the different parts of a plant. The shown parts of a plant are the root system RS, the stem structure including the stems MS, FS, FS1, FS2, FS3, FS3A, FS3B of the plant, the leaves L of the plant, the flowers FL of the plant and the buds B of the plant P.

The root system RS of the plant is the non-leaf, non-nodes bearing part of the plant P. The major functions of the root system RS may be one or more of the following:
1) absorption of water and inorganic nutrients;
2) anchoring of the plant body to the ground or any other base structure and supporting it;
3) storage of food and nutrients;
4) vegetative reproduction.

The root system RS forms one end of the plant P, the flowers FL, leaves L and buds B form the other end of the plant P. In the schematic drawing of FIG. 1 a non-fruit bearing plant is shown, but it will be apparent that a plant P may also comprise fruits as it comprises leaves L, flowers FL and buds B.

The stem structure connects the flowers FL, leaves L and buds B to the root system RS and has one or more of the following functions:
1) support for and the elevation of leaves L, flowers FL and/or fruits;
2) transport of fluids between roots and the leaves L, flowers FL and/or fruits;
3) storage of nutrients; and
4) production of new living tissue.

In the shown example, the plant P comprises a main stem MS which acts as the main support for all other plant parts except the root system RS and through which all fluids passes. In this example, the main stem MS supports the leaves L and other stems, in this case flower stem FS. The flower stem FS in turn is split up into three flower sub-stems FS1, FS2, FS3. Flower sub-stems FS1 and FS2 each carry one flower FL. Flower sub-stem FS3 is split into sub-stems FS3A and FS3B each carrying a bud B, which will later on develop into a flower FL as well. It will be apparent to the skilled person that the shown structure of the stems is a mere example and that the plant may also have a different configuration.

The method described in this specification may be applied to all kind of stems of the stem structure. However, in practice, the user will choose a specific stem for carrying out the method depending on the purpose, i.e. the intended destination, of the substances to be introduced into the plant.

When for instance the substance is intended for only the leaves L of the plant P of FIG. 1 or for all leaves L, flowers FL and buds B, the method will preferably be carried out in relation to the main stem MS, as introducing the substance into the main stem MS will result in the substance being distributed to all parts of the plant P carried by the main stem MS.

When for instance the substance is not intended for the leaves L but for the flowers FL and buds B, the method is preferably carried out in relation to the flower stem FS. Likewise, if the substance is only intended for the buds B and not for any other part of the plant, the method is preferably carried out in relation to the flower sub-stem FS3. As the methods can be applied to all kind of stems, only the general term stem is and will be used throughout the remaining detailed description of the invention.

It will be apparent to the skilled person that alternative to choosing a single specific stem, it is also possible to carry out the method in relation to multiple stems of a plant P, possibly simultaneously. For instance, if a substance is intended for the flowers FL and buds B, the method may be carried out in relation to flower stem FS as described above, but alternatively, the method may also be carried out in relation to flower sub-stems FS1, FS2 and FS3.

Figure 2:
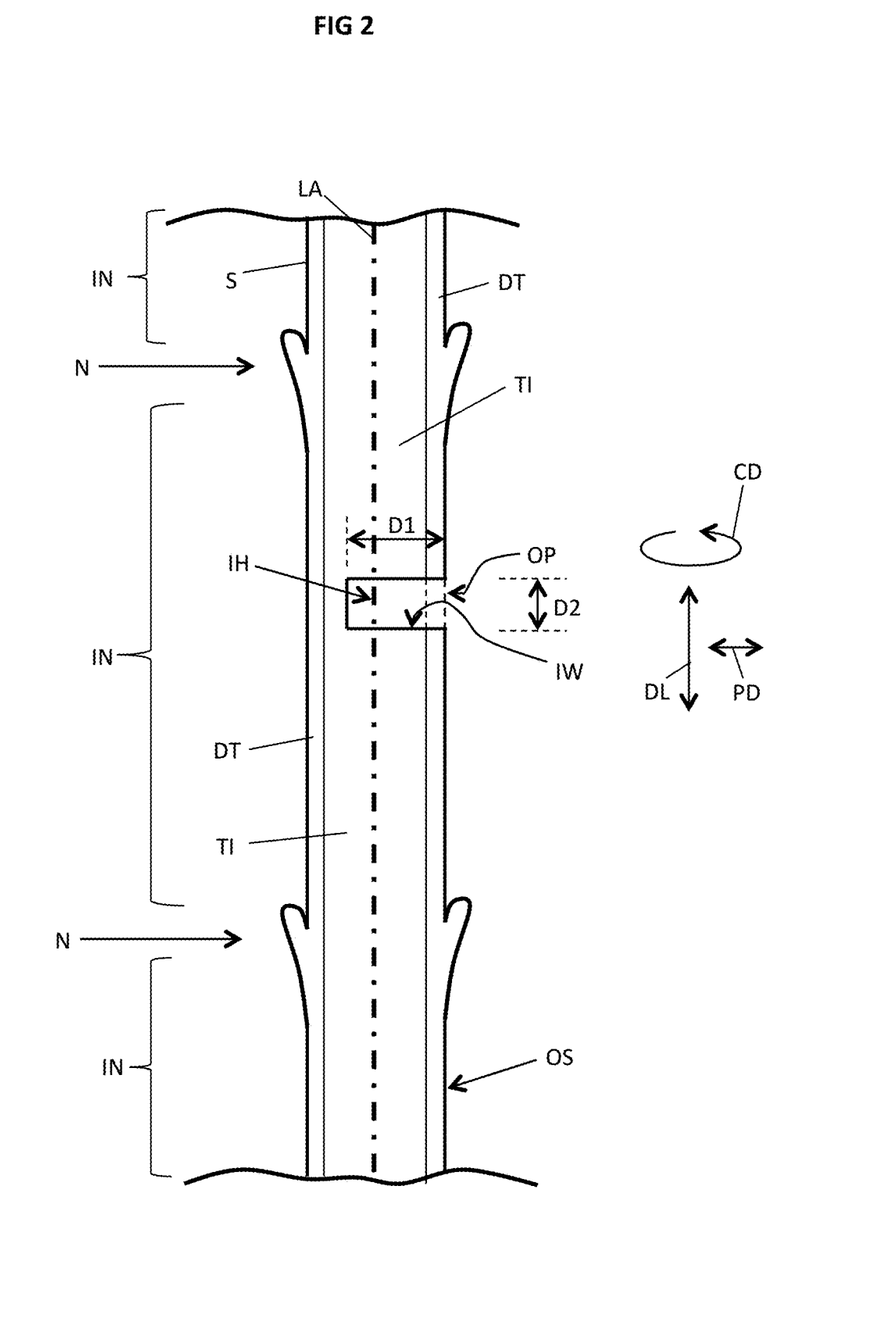
FIG. 2 depicts a cross-section of a stem of a plant in which an initial hole is formed in accordance with an embodiment according to the invention.

FIG. 2 depicts a cross-section of a stem S of a plant, e.g. a plant according to FIG. 1. The stem S of a plant is usually divided into nodes N and internodes IN in between nodes N. The nodes N may hold buds (not shown here) which grow into one or more leaves, sub-stems or flowers as shown in FIG. 1.

The stem comprises dermal tissue DT, which may alternatively be referred to as epidermis, defining an outer surface OS of the stem S and usually functions to waterproof, protect and control gas exchange. Plant tissue TI below the dermal tissue comprises vascular tissue and ground tissue filling in around the vascular tissue. The vascular tissue provides long distance transport in the form of xylem and phloem, alternatively referred to as xylem system and phloem system of a plant. The substance introduction methods described in this specification rely amongst others on the xylem and/or phloem transport systems in order to distribute the introduced substance throughout the plant, where the xylem is preferred as it has a single known transport direction where the phloem may be multi-directional. Hence, the distribution of the substance throughout the plant via the xylem system is more predictable.

The stem S defines a longitudinal axis LA. This allows to define and describe some directions in relation to the longitudinal axis. A first direction DL is oriented parallel to the longitudinal axis LA of the stem, a second direction PD is oriented perpendicular to the longitudinal axis LA of the stem, and a third direction is a circumferential direction CD around the longitudinal axis LA of the stem.

FIG. 2 depicts an initial hole IH. Below it will be assumed that the situation in FIG. 2 is an intermediate situation between forming the initial hole and the formation of the final hole.

The initial hole IH in FIG. 2 extends from an opening OP in the outer surface OS of the stem S in the second direction PD into the tissue TI, so beyond the dermal tissue DT in order to get access to the long distance transportation system, preferably the xylem. The depth D1 of the initial hole in this example is larger than the radius of the stem at this location, and is in this case also larger than the diameter D2 of the hole IH.

The initial hole IH comprises a interior wall IW delimiting the initial hole from the tissue in the stem of the plant. When a substance is introduced into the initial hole, the substance needs to penetrate the plant by passing the interior wall IW in order to be taken up by the plant, e.g. by the transportation system of the plant.

The initial hole IH may be formed by drilling or cutting, but in an embodiment is formed by inserting a hypodermic needle with a beveled tip into the stem. The beveled tip has the advantage that the needle has a sharp tip able to penetrate the dermal tissue and that the entire beveled portion of the tip forms a cutting surface which can be used to form the initial hole by subsequent rotation of the needle about its longitudinal axis, preferably after it has been brought to the desired depth D1. Rotating the needle will then cut through the tissue and allow for easy removal of the plant tissue.

Although the shown hole IH is a clean hole from which all plant material has been removed, it is also possible that the hypodermic needle only makes a circular cut without removing the tissue inside.

When the hypodermic needle is manually inserted into the stem of the plant, it can be advantageous to use a hypodermic needle of which the length of the beveled tip is substantially the same as the desired hole depth D1. In that case, the hypodermic needle can be inserted into the stem until the first moment the beveled tip is completely inserted into the stem. This will aid in preventing the hypodermic needle from being inserted too deep and extending through the plant on the opposite side of the opening OP. In that way, it is ensured that a blind hole as in FIG. 2 is formed. However, it is also possible, but not preferred to make a through hole. In that case, no precautions preventing a tool from extending through the stem need to be taken.

Figure 3:
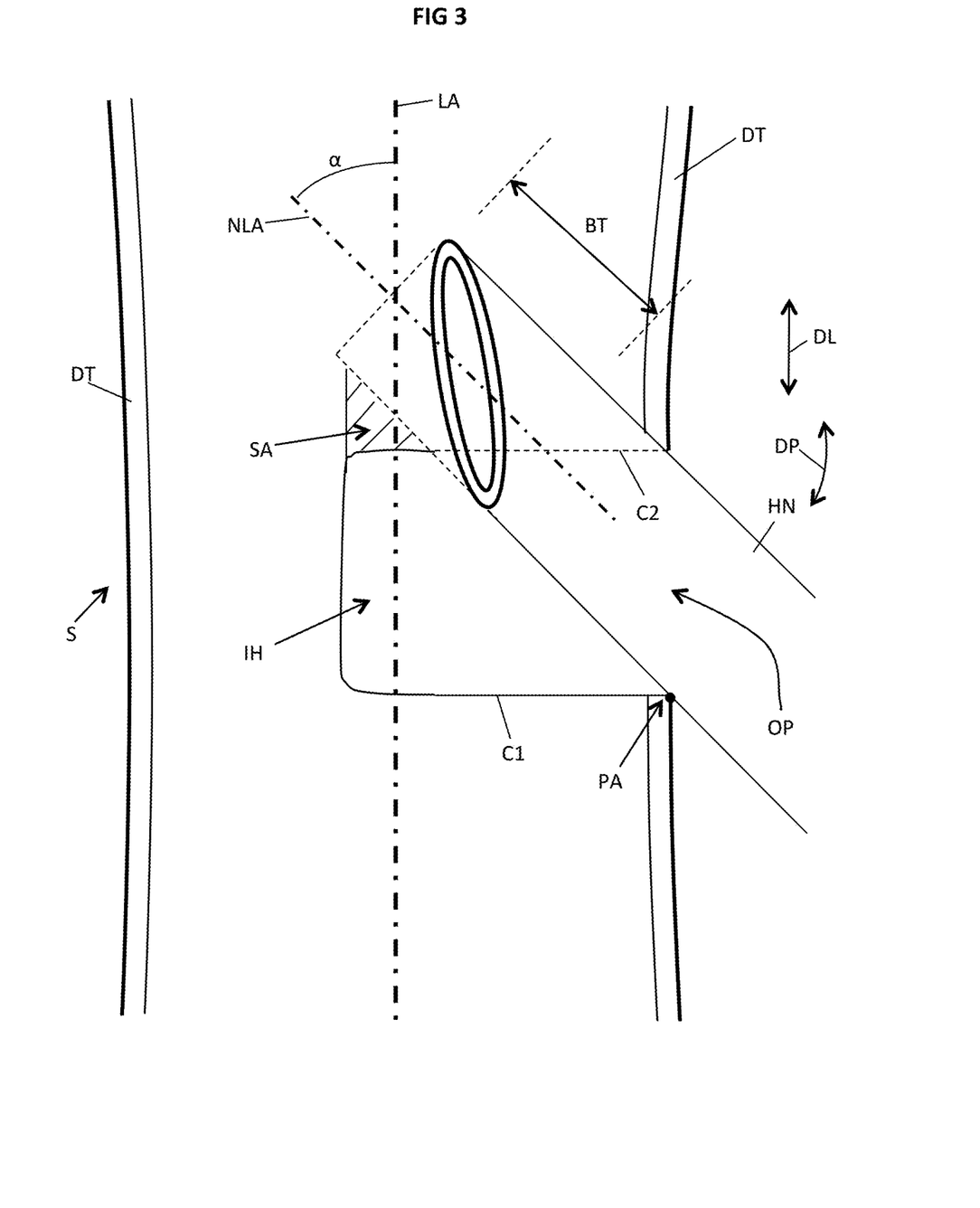
FIG. 3 depicts a cross-section of a stem of a plant in which a final hole is formed in accordance with an embodiment according to the invention.

FIG. 3 depicts the formation of a final hole according to an embodiment of the invention.

FIG. 3 is a close-up of the stem S of FIG. 2 at the initial hole IH. The contour of the initial hole of FIG. 2 is the solid line C1 in combination with the dashed line C2. A hypodermic needle HN with a beveled tip BT is inserted in the stem S via the opening OP of the initial hole IH, but the difference with respect to the formation of the initial hole IH is that the longitudinal axis NLA of the needle HN makes an acute angle α with the longitudinal axis LA of the stem S. Subsequently rotating the needle HN about its longitudinal axis NLA makes a cut, thereby extending the initial hole IH in a first direction DL (see FIG. 2) parallel to the longitudinal axis LA of the stem S. Plant material may be removed while retracting the hypodermic needle HN or even afterwards, but as indicated above, this removal of plant material is not necessary for the invention.

When in FIG. 3 the needle HN is steadily positioned and perfectly rotated about its longitudinal axis NLA, this will result in the formation of a ridge in the final hole indicated by the shaded area SA. However, in order to create a smoother final hole, this shaded area may also be removed simply by pivoting the needle up and down in a direction indicated by reference symbol DP with a lower edge PA of the opening OP acting as pivot axis. The needle HN may thus also be advantageously used to scrape plant material away.

Other methods for extending the size of the initial hole IH to form a final hole according to the invention may also be used, such as drilling, suction, chemical etching, vaporizing, piercing, cutting, etc.

Figure 4A:
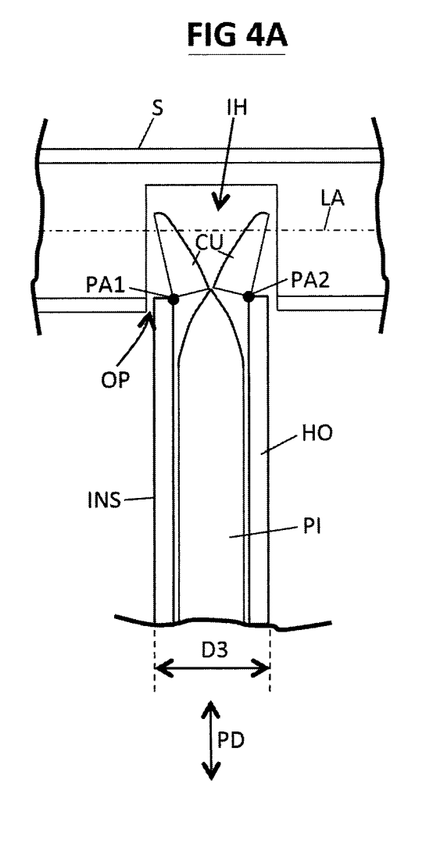
FIG. 4A-4C depict the formation of a final hole according to another embodiment of the invention.
Figure 4B:
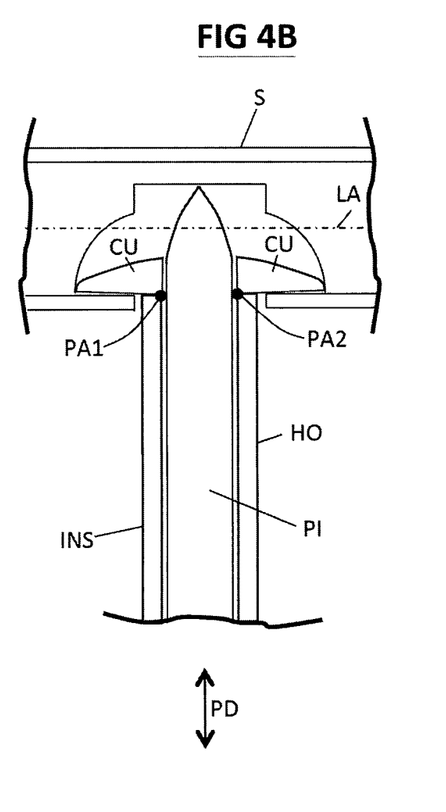

Another plant hole size extending method is shown in FIGS. 4A and 4B. In FIG. 4A, a stem S of a plant is shown with its longitudinal axis LA. An initial hole IH with opening OP is made in the stem similar to the situation of FIG. 2. The final hole in this embodiment is made by inserting a free end of an instrument INS into the initial hole IH via the opening OP.

The instrument INS comprises a housing HO and two cutters CU pivotably arranged at the free end of the housing HO about pivot axes PA1, PA2, respectively. The cutters CU have a rest position as shown in FIG. 4A in which the cutters CU do not extend sideways outside of the diameter D3 of the housing HO. This allows to insert the cutters CU into the initial hole IH via the opening OP.

When the cutters CU are positioned in the initial hole IH, the cutters can be pivoted to an operational position as shown in FIG. 4B by moving a pin PI relative to the housing HO in a direction indicated by PD, so that the pin PI pushes, i.e. pivots, the cutters CU towards the operational position of FIG. 4B thereby cutting through the plant tissue. The cut part of the plant tissue may be removed in many ways including suction, scraping and cutting. Scraping can for instance be done by slowly retracting the housing HO from the initial hole IH while the pin PI is retracted relative to the housing HO to ensure that the opening OP of the hole is not significantly affected by this operation. The result is a final hole that is extended in longitudinal direction of the stem S.

The cutters CU may be urged towards the rest position by a resilient element provided between the two cutters CU or between each cutter CU and the housing HO. It is also possible that the cutters are hingedly connected to the pin PI and thus retracting the pin PI also retracts the cutters C.

Figure 4C:
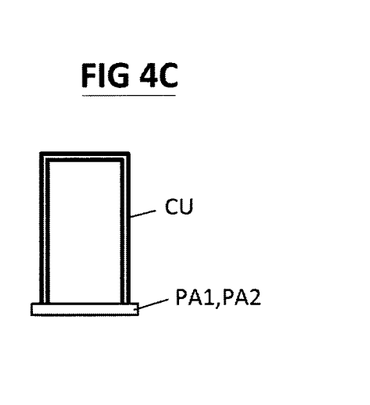

FIG. 4C depicts a side view of the cutters CU and shows the respective pivot axes PA1, PA2 without the other parts of the instrument. In this embodiment, the cutters CU have an inverted U-shape, so that an effective cut is made allowing to remove the plant material as easily as possible.

In both embodiments relating to FIG. 3 and FIGS. 4A-4C, the final hole has a dimension in a direction parallel to the longitudinal axis of the stem of the plant which is larger than a maximum dimension of the opening OP in the direction parallel to the longitudinal axis of the stem. A difference between the embodiment of FIG. 3 and the embodiment of FIGS. 4A-4C is that in the embodiment of FIG. 3 the initial hole IH is extended in one direction only, preferably away from the roots of the plant, where in the embodiment of FIGS. 4A-4C, the initial hole is extended in both directions, so away and towards the roots of the plant.

The invention claimed is:

1. A *Phalaenopsis* orchid plant, provided with a hole into its stem, wherein the hole is accessible via an opening in an outer surface of the stem, wherein the hole allows the interior of the stem to be exposed to a substance entering the plant via the opening so that the substance can enter the interior of the stem, wherein the hole has a dimension in a direction parallel to a longitudinal axis of the stem which is larger than a maximum dimension of the opening providing access to the hole in the direction parallel to the longitudinal axis of the stem, and wherein the diameter of the opening is above 2 mm, wherein in the longitudinal direction of the stem of the plant, the hole extends in a direction away from the roots of the plant and also in a direction towards the roots of the plant.

2. The plant according to claim 1, wherein the interior wall of the hole is covered with a layer of material preventing the interior wall from drying.

3. The plant according to claim 1, wherein the hole is filled with wax to close off the opening in the outer surface of the stem.

\* \* \* \* \*